E. R. WEIDLEIN.
HYDROMETALLURGICAL APPARATUS FOR THE RECOVERY OF COPPER.
APPLICATION FILED FEB. 21, 1916.

1,223,454.

Patented Apr. 24, 1917.
3 SHEETS—SHEET 2.

Fig. 2.

INVENTOR
Edward R. Weidlein

BY
Pennie Davis Marvin
ATTORNEYS

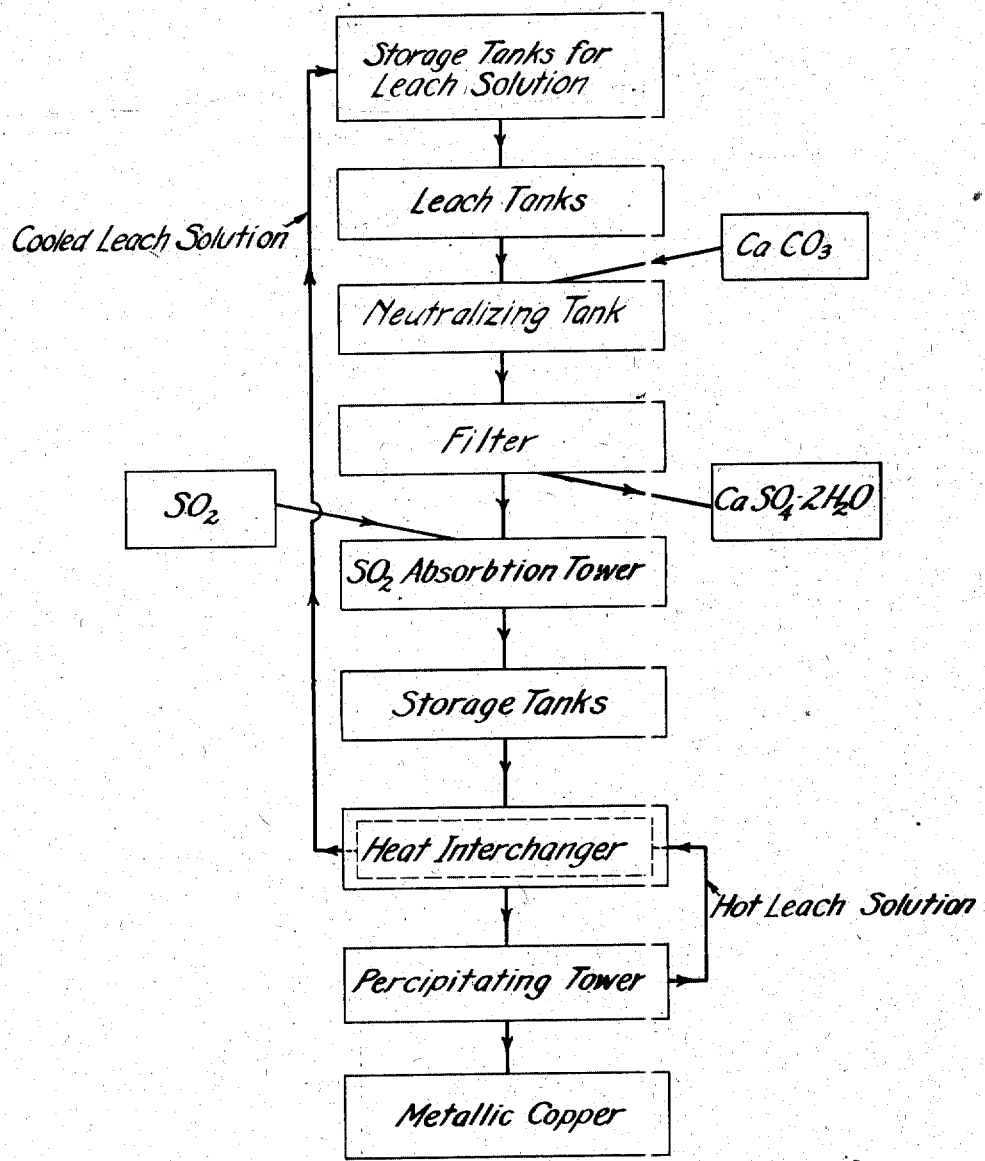

UNITED STATES PATENT OFFICE.

EDWARD RAY WEIDLEIN, OF THOMPSON, NEVADA, ASSIGNOR TO METALS RESEARCH COMPANY, OF NEW YORK, N. Y., A CORPORATION OF MAINE.

HYDROMETALLURGICAL APPARATUS FOR THE RECOVERY OF COPPER.

1,223,454.  Specification of Letters Patent.  Patented Apr. 24, 1917.

Application filed February 21, 1916. Serial No. 79,597.

*To all whom it may concern:*

Be it known that I, EDWARD RAY WEIDLEIN, a citizen of the United States, residing at Thompson, county of Lyon, State of Nevada, have invented certain new and useful Improvements in Hydrometallurgical Apparatus for the Recovery of Copper; and I do hereby declare the following to be a full, clear, and exact description of the invention, such as will enable others skilled in the art to which it appertains to make and use the same.

This invention relates to a hydrometallurgic apparatus for the recovery of copper, in a wet way, from its ores.

In my prior Patent No. 1,089,096, granted March 3, 1914, I have described and claimed the extraction of copper from copper bearing material by means of sulfuric acid and the precipitation of the copper from the resulting copper sulfate solution by treatment with sulfur dioxid at a suitable temperature and pressure. This precipitation of copper is based generally upon the reversible reaction

$$CuSO_4 + SO_2 + 2H_2O \rightleftarrows Cu + 2H_2SO_4.$$

In the preferred practice of the invention, as described in said prior patent, the ore is leached with a 3.6% sulfuric acid solution, the free acid is then neutralized, and the copper sulfate solution containing about 1.5% copper is mixed with an approximately equal amount of sulfur dioxid and then heated in the precipitating tank or tanks to a temperature of about 150° C. and a pressure of about 100 pounds per square inch. Under these conditions the copper is precipitated substantially quantitatively and a leach solution is produced suitable for re-leaching purposes.

In said prior patent it was proposed to leach with the solution as it comes hot from the precipitation tanks, thereby utilizing its maximum leaching efficiency, and making the process continuous in the sense that the leaching solution is utilized over and over again for re-leaching the ore, after the copper has been precipitated each time out of the solution.

In my application Serial No. 48,150, filed August 31, 1915, I have described a continuous process of precipitating copper from copper sulfate solutions by means of sulfur dioxid, which is continuous in the sense that the solution is continuously passing through the precipitating tank or tanks and is continuously heated therein, thereby precipitating the copper and regenerating the sulfuric acid; and I have further described the utilization of the waste heat in the solution coming from the precipitating tank for heating up the ingoing solution, instead of leaching the ore directly with this hot solution. As a result of this heat interchange the copper sulfate solution is pre-heated and the precipitating reaction is thereby facilitated, while the cooling of the hot leaching solution makes it also more efficient in that the acid losses are materially reduced by the use of a cooler leaching and extracting acid.

The present invention relates to apparatus for the practising of such processes, and in particular for the continuous precipitation of copper according to the process described and claimed in my said application Serial No. 48,150.

The invention will be described more in detail with reference to the apparatus illustrated, more or less diagrammatically, in the accompanying drawings, but it is intended and understood that the invention will be illustrated by, but is not limited to, the specific embodiments thus illustrated and described.

In the accompanying drawings

Fig. 2 shows in elevation, a modified construction similar to that of Fig. 1; and Fig. 3 shows, in diagram, the arrangement of the apparatus.

Figure 1:
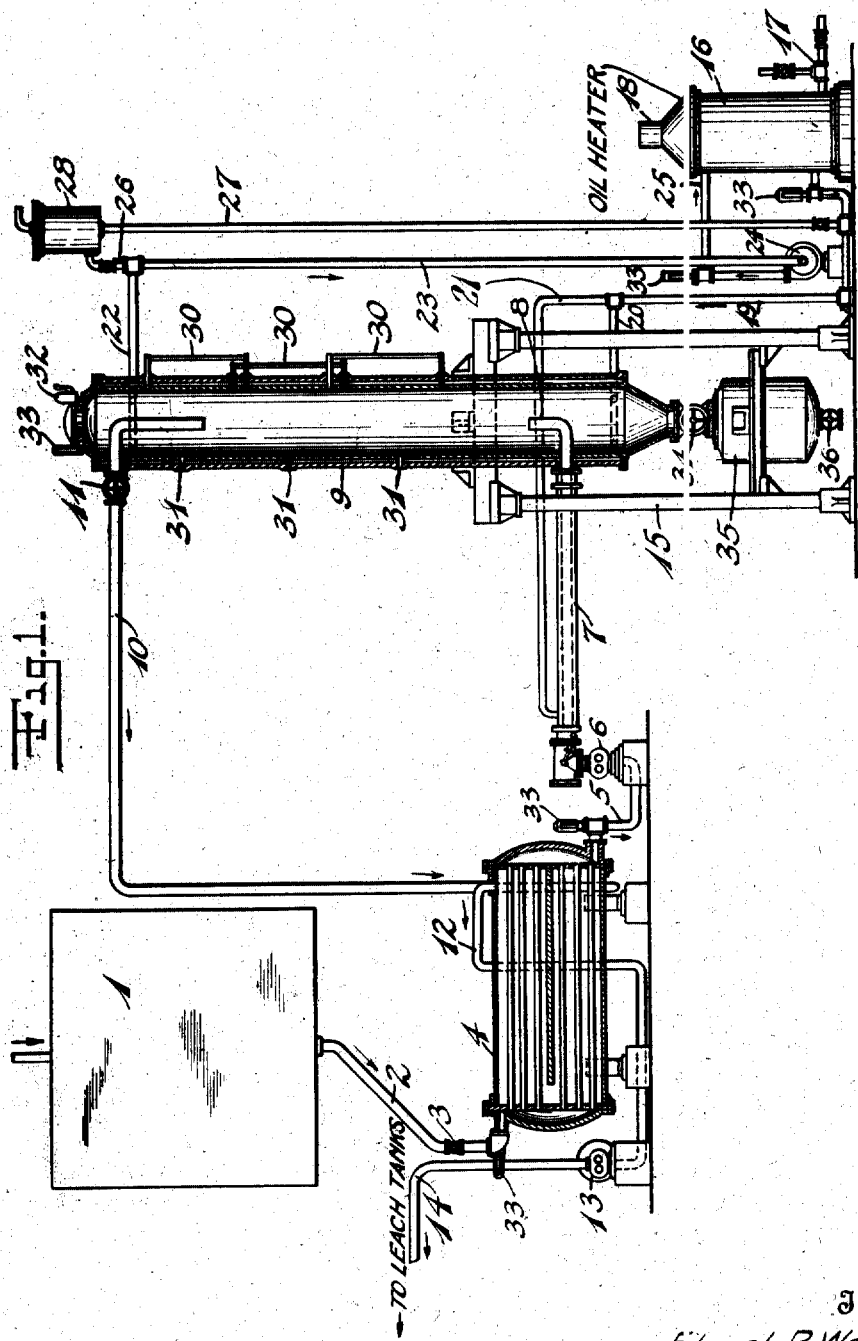
Figure 1 shows, partly in section and partly in elevation, the precipitating and heat interchanging parts of the apparatus.

Referring first to Fig. 1, the storage tank for the copper sulfate solution, after it has been neutralized and charged with sulfur dioxid (by means not shown), is indicated at 1, and is provided with an outlet 2 having therein a regulating valve 3 and leading to the heat interchanger 4 of any suitable or preferred construction. From this heat interchanger the solution passes through the pipe 5 to the pump 6 by means of which it is forced into the precipitating tank 9 under a suitable pressure of, for example, 100 lbs. per square inch. The pipe leading from the pump 6 to the precipitating tank is provided with an outer oil jacket 7, and has an upwardly arranged discharge end 8 within the tank. From the top of the tank the solution or liquor is withdrawn by means of the pipe 10, provided with a suitable regulating valve 11, and is returned thereby to the heat interchanger 4 from which it is in turn forced through the pipes 12 and 14, by means of the pump 13, back to the leach tanks.

The precipitating tank or chamber 9 is suitably supported upon supports 15 and is provided with an outer double wall or other suitable means for heating by means of oil. Such oil heating I have found to be particularly suitable for maintaining the necessary temperature within the precipitating tank. The oil heater is indicated at 16, provided with a suitable air and gas inlet 17 and with a funnel or chimney 18. From the heater the oil passes by means of the pipe 19, in part through the branch 20 to the double wall of the precipitating tank, and in part by the branch 21 to the oil jacket 7 from which it is then discharged into the double jacketed precipitating tank. The oil is drawn off from the top of the jacket by means of the pipe 22 and passes down through the pipe 23 to the pump 24 by means of which it is returned to the heater through the pipe 25, the desired circulation of the oil being thus effected. An oil expansion tank is arranged a suitable distance above the top of the circulatory system and is connected thereto by means of pipes 26 and 27.

The precipitating tank is provided with liquid gages 30 for determining the level of the liquid therein, and with openings 31 for the introduction of thermometers. It is also provided at its top with a safety valve 32 and with a thermometer 33. A suitable pressure gage (not shown) will, in practice, also be provided. Other thermometers 33 are also provided at various points of the apparatus for indicating the temperature.

The apparatus of Fig. 2 is similar in its construction and operation to that of Fig. 1, and corresponding parts are indicated by the same numerals with the suffix "a" appended thereto. In this figure, the storage tank is not shown, but the copper sulfate solution, charged with sulfur dioxide, passes through the pipe $2^a$ to the pump $6^a$ by means of which it is forced through the pipe $5^a$ to the heat interchanger. This arrangement differs from that of Fig. 1 in that the pump is arranged to force the liquor through the interchanger instead of from the interchanger to the precipitating tank or tower. Where the storage tanks 1 of Fig. 1 are not arranged a sufficient distance above the interchanger to give the necessary head of liquor and the necessary pressure therein, the arrangement of the pump ahead of the heat interchanger subjects the interchanger to substantially the same pressure as the precipitating tank and thus prevents loss of sulfur dioxid from the solution. A check-valve $5^b$ is also provided in the pipe $5^a$ leading from the pump to the heat interchanger.

From the heat interchanger of Fig. 2 the liquor passes to the precipitating tower where the precipitation takes place, and the leach liquor returns from the top of the tower to the heat interchanger in the manner indicated above in connection with the arrangement of Fig. 1. The valve $11^a$ in the pipe $10^a$ is shown in Fig. 2 as provided with a suitable pressure regulating device for automatically regulating the pressure in the precipitating tank and the outflow therefrom.

The precipitating tank of Fig. 1 is provided with a lower compartment 35 communicating with the main tank by means of a false bottom or valve 34, this lower compartment being in turn provided with a valve controlled outlet 36. The arrangement of Fig. 2 is of a similar nature, but an equalizing pipe 40 is provided around the valve 34, this pipe 40 being in turn provided with an equalizing valve, the arrangement being such that the pressure within the upper and lower compartments can be equalized before the main valve 34 is opened.

The oil heater $16^a$ of Fig. 2 has the coils (not shown) for heating the oil arranged in a casing above a masonry or brickwork base forming the combustion chamber of the furnace. The oil circulation and supply to the precipitating tank is similar to that of Fig. 1. Oil is circulated through the pipe $21^a$ to the oil jacket pipe $7^a$ and escapes therefrom around the inner pipe into the double wall of the precipitating tank. The oil expansion tank $28^a$ is placed a sufficient distance above the top of the precipitating tank so that the oil within it will be kept cool.

The control of the apparatus is suitably effected, either in an automatic manner or by suitable regulation, from the control panel 41. This control panel is connected, by a tube 42, with a thermostat arranged within the precipitating tank, and with a tube 43 leading to a thermometer arranged in the hot oil line. It is also provided with a tube 44 for regulating the fuel-oil burner and with a tube 45 to the motor of the pressure pump $6^a$.

The apparatus of Figs. 1 and 2 correspond to the heat interchanger and precipitating tower of the diagram of Fig. 3. From the heat interchanger the cooled leach solution is returned to a suitable storage tank or tanks from which it is drawn, as required, into the leach tanks. The ore or other copper bearing material is introduced into the leach tanks and there leached with the sulfuric acid leach solution. The excess acid is then neutralized by the addition of calcium carbonate or ordinary limestone, and the precipitating gypsum is suitably removed by siphoning, filtering or otherwise; or the excess acid can be neutralized by the use of any other suitable alkaline substance. In general, the copper sulfate solution should be slightly acid on leaving the leach tanks, for the reason that any of the sulfur dioxid brought into the leach tanks from the precipitating tank, in the continuous process and circulation above referred to, would tend to precipitate metallic copper within the leach tanks if the leach solution were completely neutralized therein, any such precipitated copper remaining with the gangue and being thereby lost.

The copper sulfate solution from the neutralizing tank should, in the preferred practice of the invention, contain about 1.5% of copper. Sulfur dioxid is next forced into the copper sulfate solution, in suitable amount, and the solution is then stored in suitable storage tanks, one of which is indicated in Fig. 1, from which the solution is drawn off and passed to the heat interchanger 4, where it is pre-heated by the hot leach liquor coming from the top of the precipitating tower, in the manner already described. The pre-heated copper sulfate solution, charged with the sulfur dioxid, is forced under a suitable pressure and in a continuous manner into the bottom of the precipitating tank through the oil jacketed pipe 7 or 7ᵃ in which it is further pre-heated. During the passage up through the precipitating tank, the liquor is heated to the necessary temperature of about 150° C. for the precipitation of the copper, the precipitating reaction being substantially complete as soon as the proper conditions of temperature and pressure are reached, (e. g., about 100 lbs. pressure and about 150° C.).

The precipitation of the copper is accomplished by the regeneration of twice as much sulfuric acid, theoretically, as required for extracting a corresponding amount of copper. The leach liquor containing the regenerating acid is passed through the heat interchanger where it serves to pre-heat the ingoing solution and where it is itself cooled to a temperature below its boiling point from the much higher temperature of the precipitating tank. By thus cooling the leach liquor before utilizing it for extracting further amounts of ore the acid losses in the hot solution can be materially reduced. Thus, in practice, it is possible to cool the outgoing solution from about 150° C. or 160° C. down to about 90° C. and at the same time raise the temperature of the ingoing solution from about 20° C. to about 90° C.

The excess acid regenerated during the precipitation which is not required for the leaching of further batches of ore is available for use for other purposes, as will be readily understood. There may, however, be some loss of acid during the leaching, in dissolving iron or other constituents, and there will usually be some excess of acid to be neutralized after the leaching of ore, so that more acid than is theoretically necessary is required for the leaching operation.

The precipitating tank or tower is of suitable height to permit the heating therein of the copper sulfate solution to the proper temperature, e. g., about 150° C., although in the upper part of the apparatus this temperature may be exceeded. Since the reaction is complete as soon as the proper temperature and pressure are attained, the copper will be then precipitated and will fall to the bottom of the tank, thus being withdrawn from the upper and hotter part of the tank into the cooler parts below, from which it is withdrawn into the lower compartment in the manner above indicated.

A constant pressure can be maintained within the precipitating tank by suitable regulation of the pump 6 or 6ᵃ and by means of the safety valve 32 of Fig. 1 or the automatic pressure regulator 11ᵃ of Fig. 2. The temperature can be regulated by the use of recording gages or thermometers and by control of the oil heater. It will be seen that the heated oil is circulated from the oil heater into heat interchanging relation with the liquid within the precipitating tank, and with the entering liquid in the inlet pipes 7 and 7ᵃ. In practice, it is found that the temperature of the oil and liquid in the precipitating tank can be easily regulated and controlled. Other suitable or equivalent means for effecting the necessary heat interchange between the oil and the liquid within the precipitating tank will operate in a similar manner.

With a tank such as illustrated, about three feet in diameter and twenty feet high, and having a capacity of about 1000 gallons of solution, it is possible to handle from 50,000 to 100,000 gallons of solution during twenty-four hours, the operation of the apparatus being continuous, and substantially complete precipitation of the copper being obtained.

What I claim is:

1. An apparatus for precipitating copper from copper sulfate solutions by means of sulfur dioxid, comprising a precipitating tank provided with means for heating the same to a suitable temperature, means for circulating therethrough under a suitable pressure the solution to be precipitated, and means for circulating the inflowing solution and the hot outflowing liquid into heat interchanging relation with each other; substantially as described.

2. An apparatus for extracting copper from copper bearing material with sulfuric acid and for precipitating the copper from the resulting copper sulfate solution, comprising a leaching tank for leaching the copper bearing material with sulfuric acid, a precipitating tank provided with means for heating the same to a suitable temperature, means for circulating through said precipitating tank in a continuous manner and under a suitable pressure the copper sulfate solution, together with sulfur dioxid, means for returning the outflowing liquid to the leaching tank, and means for circulating the returning hot liquid and the copper sulfate solution flowing from the leaching tank to the precipitating tank into heat interchanging relation with each other; substantially as described.

3. An apparatus for precipitating copper from copper sulfate solutions by means of sulfur dioxid, comprising a precipitating tank of considerable height provided with an inlet near its bottom and an outlet near its top, means for heating said tank to a suitable temperature, means for circulating therethrough under a suitable pressure the solution to be precipitated, and means for drawing off from the bottom of the tank the precipitated copper without interfering with the continuous operation of the apparatus; substantially as described.

4. An apparatus for precipitating copper from copper sulfate solutions by means of sulfur dioxid, comprising a precipitating tank, means for circulating therethrough under a suitable pressure the solution to be precipitated, an oil heater, and means for circulating the heated oil into heat interchanging relation with said precipitating tank to heat the same; substantially as described.

5. An apparatus for precipitating copper from copper sulfate solutions by means of sulfur dioxid, comprising a precipitating tank having a double wall for the circulation therethrough of heating oil, means for circulating through said tank under a suitable pressure the solution to be precipitated, an oil heater, and means for circulating the heated oil through said double wall of the precipitating tank; substantially as described.

6. An apparatus for precipitating copper from copper sulfate solutions by means of sulfur dioxid, comprising a precipitating tank provided with means for heating the same to a suitable temperature, a heat interchanger, means for circulating through said heat interchanger and through said precipitating tank in a continuous manner and under a suitable pressure the solution to be precipitated, and means for circulating the hot outflowing liquid from said precipitating tank through said heat interchanger; substantially as described.

7. An apparatus for precipitating copper from copper sulfate solutions by means of sulfur dioxid, comprising a precipitating tank, means for circulating therethrough under a suitable pressure the solution to be precipitated, an oil heater, means for circulating the heated oil into heat-interchanging relation with said precipitation tank to heat the same, and an expansion tank arranged above said precipitating tank and connected with the oil circulating system, whereby provision is made for expansion of the oil without circulation of the heated oil through the expansion tank; substantially as described.

In testimony whereof I affix my signature.

EDWARD RAY WEIDLEIN.

Copies of this patent may be obtained for five cents each, by addressing the "Commissioner of Patents, Washington, D. C."